(12) United States Patent
Obata et al.

(10) Patent No.: US 8,346,064 B2
(45) Date of Patent: Jan. 1, 2013

(54) RECORDING APPARATUS, RECORDING METHOD, PROGRAM AND COMPUTER-READABLE RECORDING MEDIUM

(75) Inventors: Hideo Obata, Kanagawa (JP); Shigeru Kashiwagi, Tokyo (JP); Masayoshi Ohno, Tokyo (JP)

(73) Assignee: Sony Corporation (JP)

( * ) Notice: Subject to any disclaimer, the term of this patent is extended or adjusted under 35 U.S.C. 154(b) by 1060 days.

(21) Appl. No.: 11/666,060

(22) PCT Filed: Aug. 22, 2006

(86) PCT No.: PCT/JP2006/316362
§ 371 (c)(1),
(2), (4) Date: Nov. 20, 2008

(87) PCT Pub. No.: WO2007/023784
PCT Pub. Date: Mar. 1, 2007

(65) Prior Publication Data
US 2011/0096194 A1 Apr. 28, 2011

(30) Foreign Application Priority Data
Aug. 22, 2005 (JP) ................ P2005-239305

(51) Int. Cl.
*H04N 5/77* (2006.01)
*H04N 5/93* (2006.01)
*G11B 27/00* (2006.01)
*H04N 5/84* (2006.01)
*H04N 5/89* (2006.01)

(52) U.S. Cl. ........ 386/326; 386/278; 386/282; 386/285; 386/288; 386/332; 386/334; 386/336

(58) Field of Classification Search ................ 386/278, 386/282, 285, 288, 326, 332, 334, 336
See application file for complete search history.

(56) References Cited

U.S. PATENT DOCUMENTS
2002/0018644 A1* 2/2002 Isobe et al. ............... 386/95

FOREIGN PATENT DOCUMENTS

| EP | 1 441 356 A2 | 7/2004 |
| JP | 09-034767 A | 2/1997 |
| JP | 2001-266496 A | 9/2001 |
| JP | 2004-007075 A | 1/2004 |
| JP | 2004-227630 | 8/2004 |
| JP | 3641863 B2 | 4/2005 |

* cited by examiner

*Primary Examiner* — Daquan Zhao
(74) *Attorney, Agent, or Firm* — Lerner, David, Littenberg, Krumholz & Mentlik, LLP

(57) ABSTRACT

On a recording medium, there are recorded content files and an index file. The index file is constituted by attribute information of the content files (title text data, thumbnail-image data or the like). In the case of changing (recording or deleting) the content file, the index file is updated after the change. A computer sets up, in a nonvolatile memory, status information indicative of being in a predetermined process stage, during the predetermined process stage from a start of changing the content file to a termination of updating the index file. The computer, at turning on power, determines the matching/mismatching between the content and index files recorded on the recording medium utilizing the status information, thus repairing the index file as required.

28 Claims, 11 Drawing Sheets

CORRESPONDENCE AMONG PROPERTY ENTRY FILE, VIRTUAL FOLDER AND CONTENT FILE

RECORDING APPARATUS, RECORDING METHOD, PROGRAM AND COMPUTER-READABLE RECORDING MEDIUM

CROSS-REFERENCE TO RELATED APPLICATIONS

The present application is a national stage application under 35 U.S.C. §371 of International Application No. PCT/JP2006/316362, filed Aug. 22, 2006, which claims priority from Japanese Application No. 2005-239305, filed Aug. 22, 2005, the disclosures of which are incorporated herein by reference.

BACKGROUND OF THE INVENTION

Technical Field

This invention relates to a recording apparatus, recording method, program and computer-readable recording medium, which are for recording the content and index files onto a recording medium. More particularly, the invention relates to a recording apparatus, etc. adapted to easily determine, in a predetermined process stage from a start of content-file change to a termination of updating the index file, the matching/mismatching between the index and content files recorded on a recording medium by setting up status information, indicative of being in the predetermined process stage, in a storage area where a storage matter can be held even during the power-off of the apparatus body, etc., when turning on power.

BACKGROUND OF THE INVENTION

There has been conventionally proposed, as in patent document 1, etc., a method of using an index file to simply find out a desired file out of a multiplicity of content files recorded on a large-capacity recording medium.

The index file is constituted by or produced with a set of attribute information of content files. The content-file attribute information includes, for example, thumbnail image data, title text data, photographic date, codec information and face-detected information (detected facial size, detected face position, detected face score as a digitization of detected face). However, the attribute information is not limited to those.

In a recording apparatus for recording an index file, together with a content file, onto a recording medium, when an imaging result, for example, is recorded as one content file onto the recording medium, the index file recorded on the recording medium is updated correspondingly to the recording of the content-file.

Meanwhile, in the recording apparatus, even when the content file recorded on the recording medium is deleted, the index file is updated correspondingly to the deletion of the content file.

In this manner, in the recording apparatus for recording an index file together with a content file onto the recording medium, when there is a change in the content file recorded on the recording medium due to recording or deletion of a content, update is carried out on predetermined information of the index file being recorded on the recording medium thereby to make the index and content files matching.

In the meanwhile, by applying the foregoing index file to a portable digital still camera, a camcorder or the like, even where a multiplicity of content files are recorded onto one recording medium, a desired content file can be positively found out of the multiplicity of content files with ease. This increasingly improves the usability.

[Patent Document 1] JP-A-2004-227630

DISCLOSURE OF THE INVENTION

Problem that the Invention is to Solve

The index file is an independent file to be managed by a file-management system related to a recording medium similarly to the content file to be managed by the index file. Accordingly, where applying the index file to a portable digital still camera or the like, the followings are to be anticipated.

For example, there may be a case that a power disconnection is caused by an accident, etc. before the index file is updated. Also, there may be a case that, where the recording medium is a removable memory card, etc., the recording medium is detached from the apparatus body before the index file is updated.

With reference to FIG. 11, explanation is made here on the matching/mismatching between the index and content files.

In the event that a trouble, such as power disconnection, occurs in a state ST1 that there are content files (A), (B) and an index file (IF) produced with a set of attribute information of the content files A, B, in a recording medium, the index file IF matches the content files A, B.

In the case content-file (C) recording is started in the normal state ST1 and then a trouble, such as power disconnection, occurs in state ST2 that the content-file (C) recording is being carried out, there encounters a difficulty in reproducing the content file C being recorded. Incidentally, in this case, the index file IF still matches the content files A, B.

On the contrary, where a trouble, such as power disconnection, occurs in normal state ST3, that is, after a completion of recording the content file C and before a start of recording the index file IF, the index file IF does not match the content files A, B, C.

Meanwhile, where the content-file C recording is completed, subsequently the index-file IF update is started and a trouble, such as power disconnection, occurs in index-file update state ST4 that the index file IF is being updated, there is a difficulty in reproducing the index file IF itself.

In the case of further recording the content file C in the normal state ST1, the index file IF first becomes matching the content files A, B, C in state ST5 that the content-file C recording is completed and further index-file IF update is completed.

Incidentally, where deleting the content file recorded on the recording medium conversely to the series of processes as described, the index file IF does not match the content file even if there is an occurrence of a trouble, such as power disconnection, in normal state ST2 that the content file is being deleted.

As mentioned above, where the index and content files are not in matching or where the index file is broken, there is a difficulty in finding out a desired file by use of the index file.

It can be considered, as one approach for solving the problem, to confirm the matching/mismatching between the index and content files at a startup (upon turning on power) and to repair the index file when matching is not available or the index file is broken.

However, where such a process is executed, there is a need to sequentially collate the content file recorded on the recording medium to the index file each time power is turned on. As the number of content files increases, time is required for the startup process (upon turning on power), which is problematically inconvenient for the user. There is a desire to simplify the processing upon turning on power and to repair the index file as required.

It is an object of the present invention to make easily determine the matching/mismatching between the content and index files recorded on a recording medium when turning on power.

SUMMARY OF THE INVENTION

Means for Solving the Problem

The concept of the invention lies in a recording apparatus that records one or more content files and an index file produced with a set of attribute information of the content files, onto a recording medium, the recording apparatus comprising:

a content file changing section that changes the content files to be recorded onto the recording medium;

an index file updating section that, when the content files are changed by the content file changing section, updates the index file corresponding to the content files to be changed; and a status-information setting section that sets up status information indicative of being in a predetermined process stage in predetermined process stages from a start of changing the content file by the content-file changing section up to a termination of updating the index file by the index-file updating section, in a storage area where a storage matter can be held even during power off in the recording apparatus.

In the invention, at least content and index files are recorded on the recording medium. The index file is produced with a set of attribute information of the content files. The content files, to be recorded onto the recording medium, are changed by the content-file changing section. Here, the change of the content files to be recorded onto the recording medium, means to newly record a predetermined content file, to delete a predetermined content file from the recording medium, or so.

When the content files to be recorded onto the recording medium are changed by the content-file changing section, the index file being recorded on the recording medium is updated by the index-file updating section. By updating the index file, matching is achieved between the index file being recorded on the recording medium and the content files.

In the predetermined process stage from a start of changing the content file in the content-file changing section up to a termination of index-file update in the index-file updating section, the status-information setting section sets up, in a storage area, status information indicative of being in the predetermined process stage. The storage area is configured by a nonvolatile memory, etc., which is a storage area where a storage matter can be held even during power-off.

In this manner, in the predetermined process stage from a start of changing the content file in the content-file changing section up to a termination of index-file update in the index-file updating section, status information indicative of being in the predetermined process stage is set up in a storage area where a storage matter can be held even during power-off. Accordingly, by utilizing the status information during power-on, matching/mismatching can be easily determined between the content files and the index file that are recorded on the recording medium, thus allowing to repair the index files as required.

For example, the recording device further includes an index-file repairing section that repairs, upon turning on power, the index file recorded on the recording medium depending upon the content files recorded on the recording medium when the status information recorded in the recording area indicative of being in a course of update processing.

For example, the foregoing process stage is configured to include (1) a first process stage to a termination of changing the content file after a start of changing the content file, and (2) a second process stage to a termination of updating the index file after a termination of updating the content file.

Where the predetermined process stage includes the first and second process stages in this manner, when the status information stored in the storage area is indicative of being in the first stage when turning on power, repair is made on the index file recorded on the recording medium in its portion not matching the content files recorded on the recording medium. Meanwhile, an index-file repairing section is further included that corrects a portion of the index file recorded in the recording medium not matching the content files recorded on the recording medium when the status information is indicative of being in the first process stage, and produces the index file and recording the same onto the recording medium depending upon the content files recorded on the recording medium when the status information is indicative of being in the second process stage.

In the case the status information upon turning on power is in the first process stage, it can be considered that the index file is not broken but any abnormality is occurring on the content-file side. Accordingly, in this case, the index-file repairing section only has to repair the portion of the index file not matching to the content files. On the contrary, in the case the status information upon turning on power is in the second process stage, the index file is possibly broken so that the index-file repairing section is required to newly produce an index file.

For example, the recording device further includes a to-user offering section that offers, to a user, the content files recorded on the recording medium depending upon the index file. In this case, when the status information stored in the storage area is indicative of being in a course of updating, the content files recorded on the recording medium are offered to the user according to the index file repaired by the index-file repairing section. Meanwhile, when the status information is indicative of completion of the update processing, the content files recorded on the recording medium is offered to the user according to the index file recorded on the recording medium.

In this manner, when the status information stored in the storage area is indicative of being in a course of processing, the index files repaired by the index-file repairing section are used. The content files recorded on the recording medium can be always accurately offered to the user depending upon the index file matching the content files recorded on the recording medium.

Effect of the Invention

According to the invention, in a predetermined process stage from a start of changing the content file up to a termination of index-file update, status information indicative of being in the predetermined process stage is to be set up in a storage area where a storage matter can be held during power-off. When turning on power, matching/mismatching can be easily determined between the index and content files that are being recorded on the recording medium.

DESCRIPTION OF REFERENCE NUMERALS AND SIGNS

1 . . . digital still camera, 2 . . . recording medium, 3 . . . recording and reproducing section, 4 . . . microcomputer, 5 . . . index-file memory, 6 . . . encoder, 7 . . . decoder, 9 . . . buffer memory, 10 . . . image processing section, 11 . . . camera section, 12 . . . display section, 13 . . . dial operator, 14 . . . operation button, 15 . . . nonvolatile memory.

BEST MODE FOR CARRYING OUT THE INVENTION

Detailed Description

Figure 1:
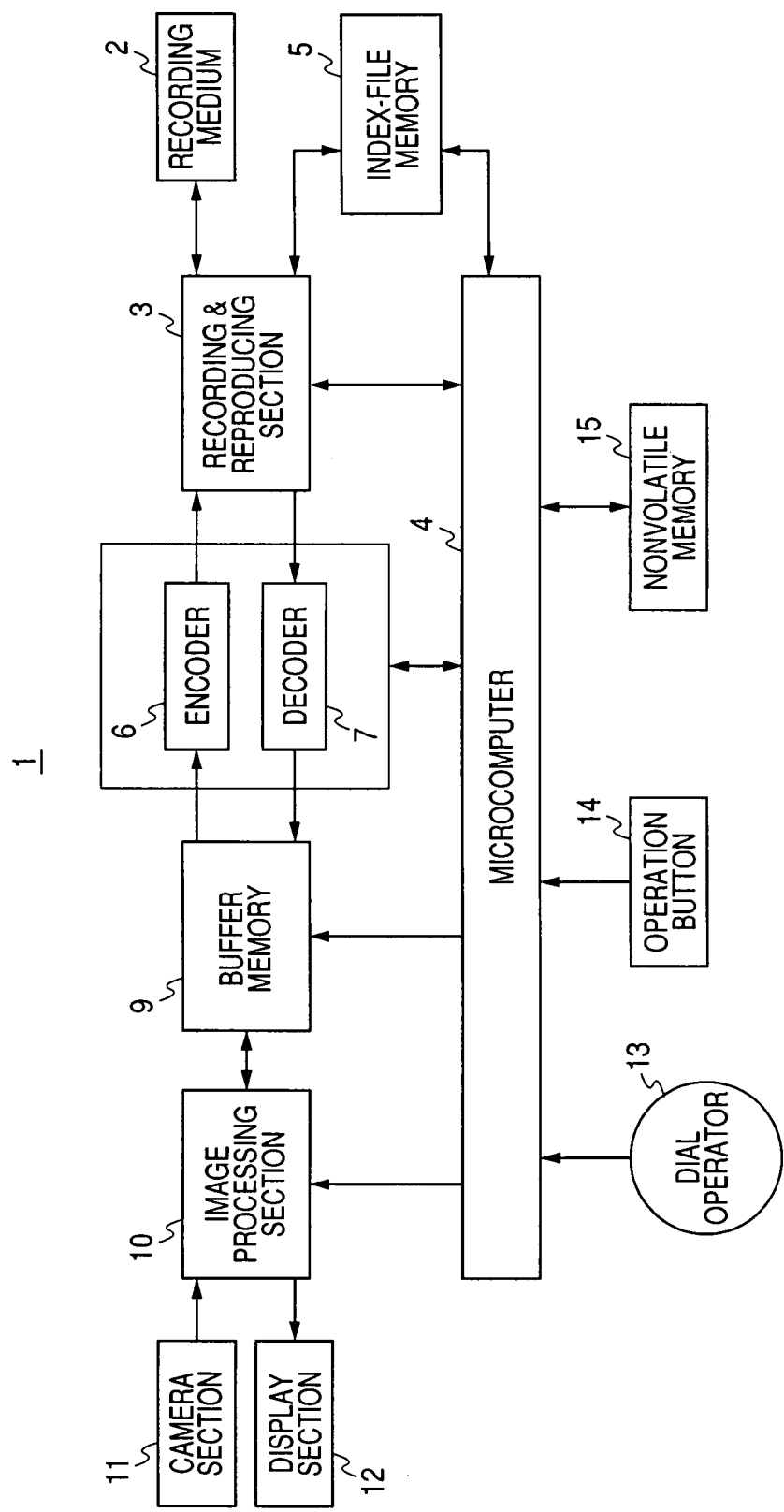
FIG. 1 is a block diagram showing a configuration of a digital still camera.

An embodiment of the present invention will be explained. FIG. 1 shows a configuration of a digital still camera as an embodiment. The digital still camera 1 has a recording medium 2, a recording and reproducing section 3, a microcomputer 4, an index-file memory 5, an encoder 6, a decoder 7, a buffer memory 9, an image processing section 10, a camera section 11 and a display section 12.

Due to the execution of the program recorded in a not-shown memory, the microcomputer 4 configures a control section that takes control of the overall operation of the digital still camera 1. The microcomputer 4 is connected with a dial operator 13, an operation button 14 and a nonvolatile memory 15. The dial operator 13 is an operator for the user to switch over the drive condition, etc. of a solid-state imager device constituting the camera section 11. The operation button 14 includes a shutter button, a zoom button, a record/reproduce/delete button, a reproducing-file select button, and so on, thus constituting an operation section for the user to operate the digital still camera 1.

Incidentally, in the embodiment, the program related to the processing of the microcomputer 4 is provided by being previously installed on the digital still camera 1. However, the program may be downloaded via a network, such as the Internet, in place of previous installation, or may be provided by being recorded on in various types of recording media, such as a magnetic disk or a memory card.

The recording medium 2 is made, for example, as a memory card, and removably loaded in the recording and reproducing section 3. The recording medium 2 is to record a file management system, etc. besides content files imaged by the camera section 11, an index file produced with a set of attribute information of the content files. The content-file attribute information includes, for example, thumbnail image data, title text data, photographic date, codec information and face-detection information (detected-face size, detected face position, detected face score in which a detected face is digitized).

Figure 2:
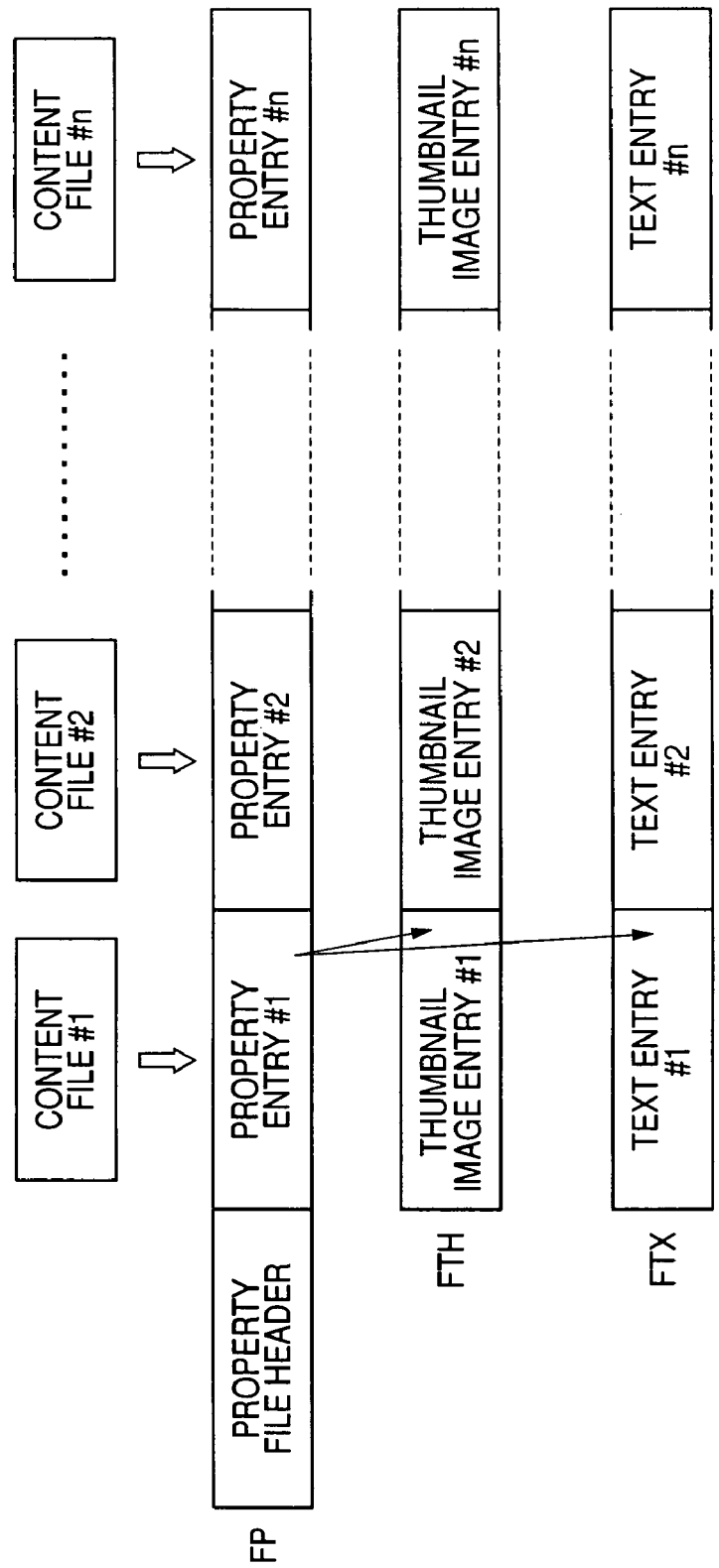
FIG. 2 is a figure for explaining the text entry file, thumbnail-image entry file and property entry file constituting an index file.

The index file is made up, for example, with text files (or meta-data files) FTX, thumbnail image files FTH and property files FP, as shown in FIG. 2. The attribute information of each content file is separately arranged in the text file FTX, the thumbnail image file FTH and the property file FP.

However, for a certain type of content file, there is a possible case that no attribute information is arranged in the text file FTX and the thumbnail image file FTH. In FIG. 2, shown is the case that there exist, as content file's attribute information, attribute information to be arranged in the text file FTX, the thumbnail image file FTH and property file FP.

Incidentally, in the embodiment, the index file, made up by property, thumbnail-image and text (or meta data) files, is particularly referred to as an AV-index file.

Here, the text file FTX is to manage text information (meta data when it is a meta data file). The thumbnail-image file FTH is to manage thumbnail-image data. The property file FP is to manage the attribute information (basic attribute information) except for the attribute information related to the text file FTX or thumbnail image file FTH, and to manage the slot-to-slot connection information of another entry file.

The file FP, at its beginning, is arranged with a header indicative of attribute, etc. On the contrary, the files FTX, FTH are not arranged with a header at their beginning. However, there are cases that the files FTX, FTH, at their beginning, are arranged with a header indicative of attribute, etc., similarly to the file FP. Following the header, successively arranged are entries (property entry #1, property entry #2, . . . , thumbnail image entry #1, thumbnail image entry #2, . . . , text entry #1, text entry #2, . . . ) each of which is attribute information of the content file.

Each entry of the text file FTX is assigned with data indicative of characters of disk title and content-file title. Each entry of the thumbnail image file FTH is assigned with a disk title and thumbnail-image data indicative of a content of each content file.

The text and thumbnail image files FTX, FTH have entries each structured with a slot having a fixed length. The number of slots constituting the each entry is one or plurality in accordance with the data amount of the attribute information assigned to the entry. Incidentally, for a certain type of content file, no entries are possibly provided as mentioned before because the attribute information is different in type.

The property file FP has entries each assigned with a disk title and data indicative of attributes of the content files. The property file FP is constituted with slots having a fixed length similarly to the text and thumbnail-image files FTX, FTH. The property file FP is provided with entries correspondingly to content files without exceptions even where the content files are different in type variously.

The property file FP has entries each set with management information (relational information as shown by the arrow in FIG. 2) specifying the corresponding entries of the text and thumbnail-image files FTX, FTH, as management information indicative of the relationship to other entries. Meanwhile, the property file FP entry, constituted with a plurality of slots, is set with management information specifying the succeeding slot to a certain slot. Meanwhile, the property file FP has entries each set with information specifying the corresponding content file.

The index file IF is structured as above. For this reason, the data sequence recorded, for example, in the text file FTX can be reproduced to display a listing of titles of content files recorded on a recording medium 2. Meanwhile, the data sequence recorded, for example, in the thumbnail-image file FTX can be reproduced to display a listing of thumbnail images of the content files recorded on the recording medium 2.

Incidentally, the index file IF can be defined not only with such real content files but also with virtual folders by means of files FTX, FTH, FP. The property file FP entries are each set with information defining a hierarchical structure of the content files and virtual folders.

Figure 3:
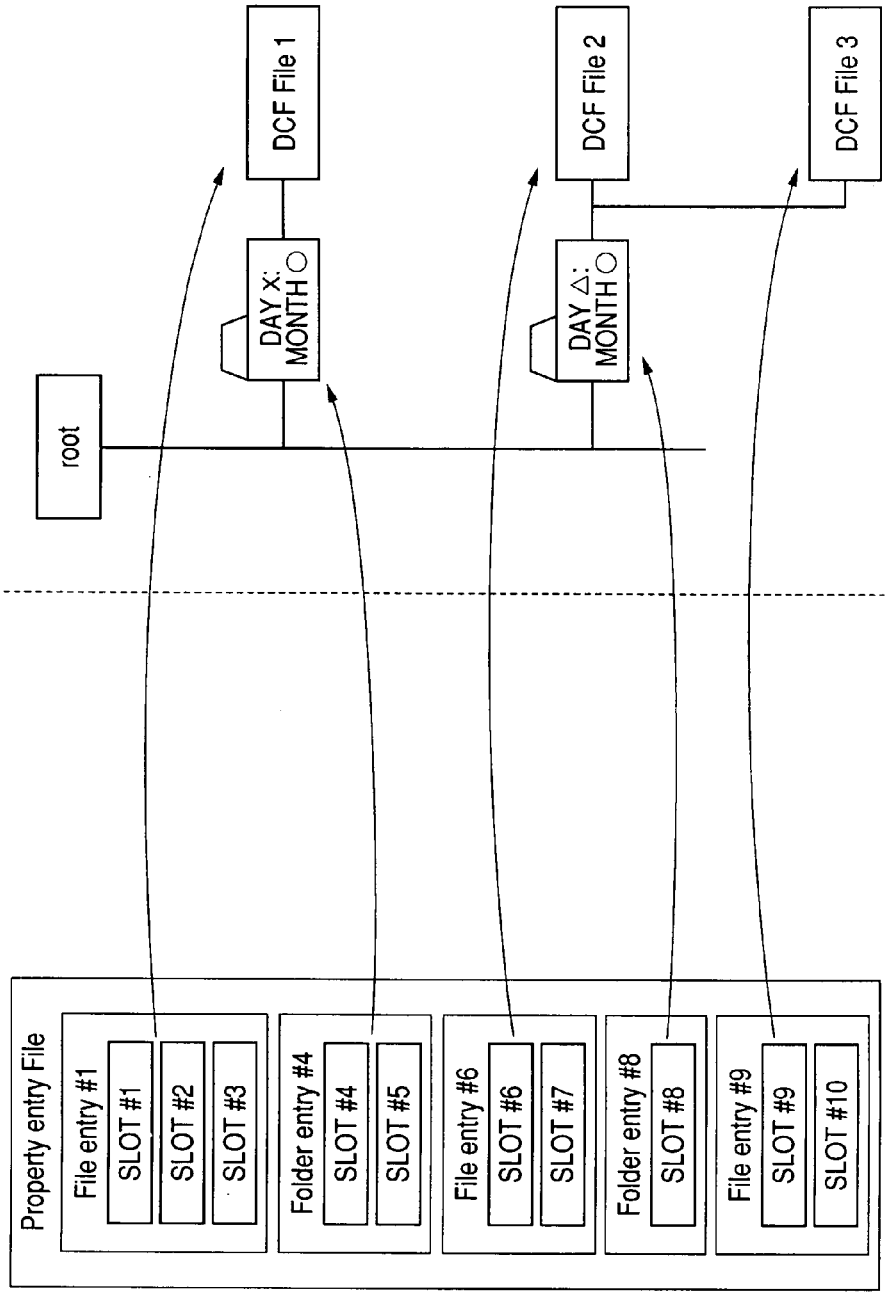
FIG. 3 is a figure showing an example of corresponding relationship among the property entry file, the virtual folder, and content file.

FIG. 3 shows an example of a corresponding relationship among the property file and the content file and virtual holder. In this example, there are on the same hierarchy a virtual folder having photographic date "day X: month O" and a virtual folder having photographic date "day Δ: month O". A content file "DCF File 1" exists on a layer lower than the virtual folder of "day X: month O". Content files "DCF File 2", "DCF File 3" exist on a layer lower than the virtual folder of "day Δ: month O".

Correspondingly to the hierarchical structure like this, a file entry #1, a folder entry #4, a file entry #6, a folder entry #8 and a folder entry #9 are formed in the property file, as shown in FIG. 3. Note that each entry number is given by a first slot number among the slots constituting the relevant entry. In the illustrated embodiment, each entry number is given by the minimal number of the slot constituting the relevant entry, for convenience sake.

The file entries #1, #6, #9 are to respectively manage the content files "DCF File 1", "DCF File 2" and "DCF File 3". The folder entries #4, #8 are to respectively manage the virtual folders of "day X: month O" and "day Δ: month O".

Referring back to FIG. 1, in the nonvolatile memory 15 connected to the microcomputer 4, status information is set up by the microcomputer 4 which is indicative of being in a predetermined process stage, in the predetermined process stage from a start of changing the content file to be recorded to the recording medium 2 as mentioned before to a termination of updating the index file to be recorded to the recording medium 2. The nonvolatile memory 15 configures a storage area where a storage matter can be held even during power-off. Meanwhile, the microcomputer 4 configures a status-information setting section. Here, content file change means to record a predetermined content file onto the recording medium 2, to delete a predetermined content file from the recording medium 2, or so.

The camera section 11 is to take a picture of a photographic subject and to output image data corresponding to the subject. The camera section 11 is configured with an imaging optical system, an imager device, an image signal processing section and so on. As the imager device, a CMOS (complementary metal oxide semiconductor) solid-state imager device, a CCD (charge coupled device) solid-state imager device, or the like is used.

The light from the subject is illuminated to the image plane of the imager device through the imaging optical system so that an optical image of the subject is formed on the image plane. In the imager device, imaging is performed in the state that an optical image is formed on the image plane in this manner. The image signal, outputted from the imager device, is subjected to processing, such as sample hold and gamma correction, in the image-signal processing section, thereby producing image data.

The display section 12 is configured, for example, with a display, e.g. an LCD (liquid crystal display), and a peripheral circuit of the display. Upon recording, the display section 12 is cause to display an image based on the image data corresponding to the subject and outputted from the camera section 11. Meanwhile, upon reproducing, the display section 12 is caused to display an image related to a predetermined content file reproduced from the recording medium 2.

The image processing section 10, upon recording, is to correct the image data, outputted from the camera section 11, for its color temperature, etc. and output it to the buffer memory 9, and further to correct the image data for its resolution, etc. and supply it to the display section 12, thereby displaying an image corresponding to the subject on the display section 12. Meanwhile, the image processing section 10, upon reproducing, is to correct the image data, outputted from the buffer memory 9, for its resolution, etc. and supply it to the display section 12, thereby displaying a reproduced image on the display section 12. Meanwhile, the image processing section 10, upon displaying a thumbnail image or a menu in various kinds, is to supply the thumbnail-image data related to the index file outputted from the buffer memory 9 or the image data of a menu in various types, to the display section 12, thereby displaying a thumbnail image or a menu in various kinds on the display section 10.

The buffer memory 9, upon recording, is to temporarily hold the image data outputted from the image processing section 10 and output the held image data to the encoder 6 according to an instruction from the microcomputer 4. Meanwhile, the buffer memory 9, upon reproducing, is to temporarily hold the image data outputted from the decoder 7 and output it to the image processing section 10. Meanwhile, the buffer memory 9, upon displaying a thumbnail image or a menu in various kinds, is to temporarily hold the thumbnail image data related to the index file outputted from the microcomputer 4 or the image data related to a menu in various kinds, and to supply those to the image processing section 10.

The encoder 6, upon recording, is to data-compress the image data outputted from the buffer memory 9 according to the JPEG (joint photographic coding experts group) technique and supply it, as content file data, to the recording and reproducing section 3. Meanwhile, upon data compression, the encoder 6 is to generate, from image data, thumbnail image data for use in preparing an index file and supply the thumbnail image data to the index-file memory 5 through the microcomputer 4.

The decoder 7, upon reproducing, is to data-decompress the content file data outputted from the recording and reproducing section 3 and supply the resulting image data to the buffer memory 9.

The index-file memory 5, upon turning on power, is to acquire and hold the index file data recorded on the recording medium 2 through the recording and reproducing section 3. Meanwhile, upon recording a content file to the recording medium 2, the index-file memory 5 is to update the index file being held therein by use of the thumbnail image data, etc. produced by the encoder 6 and supply the updated index file data to the recording and reproducing section 3, thus updating the index file on the recording medium 2.

The recording and reproducing section 3, upon turning on power, is to acquire the file-management system data recorded on the recording medium 2 and thereby detect an available space on the recording medium 2, a content file recorded on the recording medium 2, index-file positional information, etc. Meanwhile, the recording and reproducing section 3, upon turning on power, is to read an index file out of the recording medium 2 and supply the data of the index file to the index-file memory 5.

Meanwhile, the recording and reproducing section 3, upon recording, is to record the content file data outputted from the encoder 6 onto the recording medium 2. Meanwhile, after recording the content file data onto the recording medium 2, the recording and reproducing section 3 is to update the index file recorded on the recording medium 2 according to the index file data held in the index-file memory 5 and updated to cope with the recording of the content file. Meanwhile, the recording and reproducing section 3 is to update the file-management system data correspondingly to the index-file update.

The recording and reproducing section 3 configures a content-file changing section that changes the content files to be recorded onto the recording medium 2. Meanwhile, the recording and reproducing section 3 configures an index-file updating section that updates the index file recorded on the recording medium 2.

Meanwhile, the recording and reproducing section 3, upon reproducing, is to read the data of a content file corresponding to the file name designated by the microcomputer 4 and supply it to the decoder 7.

The operation of the digital still camera shown in FIG. 1 is explained briefly.

When the apparatus body, etc. is powered on by the operation of a user, the microcomputer 4 instructs the recording and reproducing section 3 to acquire the data of the file management system. The recording and reproducing section 3 acquires the data of the file management system from the recording medium 2, depending upon the instruction. The recording and reproducing section 3 detects an available space on the recording medium 2, a content file on the recording medium 2, index-file record positional information, etc. depending upon the file-management system data. Meanwhile, the recording and reproducing section 3 further acquires the index file from the recording medium 2 depending upon the result of detection. The data of the index file is supplied from the recording and reproducing section 3 to the index-file memory 5 and held therein.

In this manner, when turning on power, the index file data held in the index-file memory 5 is repaired, as required, based on the status information stored in the nonvolatile memory 15 so that the index file can be matched with the content file recorded on the recording medium 2. The repair operation will be referred later.

Explanation is made on the operation, upon recording, to record a content file imaged by the digital still camera, onto the recording medium 2.

By user's shutter operation, the camera section 11 outputs image data whose one screen is held into the buffer memory through the image processing section 10. The image data in an amount of one screen is corrected for resolution, etc. in the image processing section 10 and then supplied to the display section 12. The display section 12 displays thereon an image corresponding to the shutter operation. By means of the image displayed on the display section 12, the user is allowed to confirm the content thereof.

In this manner, when there is a recording instruction from the user while an image in an amount of one screen is held in the buffer memory 9, the image data held in the buffer memory 9 is data-compressed in the encoder 6 and supplied, as content file data, to the recording and reproducing section 3. The content file data is recorded by the recording and reproducing section 3 in a predetermined available space on the recording medium 2.

In concurrent with the recording process of the content file, the encoder 6 produces thumbnail-image data from the one-screen amount of image data. From the thumbnail-image data and the file name of the content file that are attribute information of the content file to be recorded, the microcomputer 4 updates the index file data recorded in the index-file memory 5.

As mentioned before, after recording the content file onto the recording medium 2, the recording and reproducing section 3 updates the index file, recorded on the recording medium 2, depending upon the index file data held in the index-file memory 5 and updated correspondingly to the recording of the content file. Thereafter, the recording and reproducing section 3 updates the file-management system data recorded on the recording medium 2, correspondingly to the update of the index file.

Next, explanation is made on the operation, upon reproducing, to reproduce a predetermined content file by referring to a listing of the content files recorded on the recording medium 2.

When the user instructs to display a listing of content files, the microcomputer 4 sequentially acquires thumbnail-image data corresponding to each content file from the index file data recorded in the index-file memory 5 and supply it to the buffer memory 9. The buffer memory 9 outputs the thumbnail image data related to the listing displayed and supplies the relevant image data to the display section 12 through the image processing section 10. The display section 12 displays thereon a listing of thumbnail images related to each content file recorded on the recording medium 2.

In this manner, when a predetermined thumbnail image is selected and instructed for reproducing by user's operation, for example, with the dial operator 13 while thumbnail images are list-displayed on the display section 12, the microcomputer 4 instructs the recording and reproducing section 3 to reproduce the content file corresponding to the predetermined thumbnail image in accordance with the recording in the index-file memory 5. Based on the instruction, the recording and reproducing section 3 reproduces from the recording medium 2 a content file corresponding to the predetermined thumbnail image. The reproduced content file data is supplied to the decoder 7 where it is data-decompressed. The resulting image data is supplied to the display section 12 through the buffer memory 9 and image processing section 10. The display section 12 displays a reproduced image thereon.

Next, explanation is made on the operation, upon deleting, to delete a predetermined content file by referring to a listing of the content files recorded on the recording medium 2.

When a predetermined thumbnail image is selected and instructed for deleting by user's operation, for example, with the dial operator 13 while thumbnail images are list-displayed on the display section 12, the microcomputer 4 instructs the recording and reproducing section 3 to delete the content file corresponding to the predetermined thumbnail image in accordance with the recording in the index-file memory 5. Based on the instruction, the recording and reproducing section 3 deletes from the recording medium 2 the content file corresponding to the predetermined thumbnail image.

In concurrent with the deleting of the content file, the microcomputer 4 updates the index file data recorded in the index-file memory 5. After deleting the content file from the recording medium 2 as mentioned above, the recording and reproducing section 3 updates the index file data recorded on the recording medium 2 by means of the index file data held in the index-file memory 5 and updated correspondingly to the deleting of the content data. Thereafter, the recording and reproducing section 3 updates the file-management system data recorded on the recording medium 2 correspondingly to the updating of the index file.

Incidentally, as mentioned above, when changing the content file recorded on the recording medium 2 (upon recording and deleting the content file), the microcomputer 4 sets up in the nonvolatile memory 5 status information indicative of being in a predetermined process stage, in the predetermined process stage from a start of changing the content file up to a termination of updating the index file.

In this embodiment, a status flag, for example, is applied for the status information. Meanwhile, in the embodiment, there are included, for example, in the update stage, (1) a first process stage to a termination of changing a content file after a start of changing the content file and (2) a second process stage to a termination of updating an index file after a termination of changing the content file.

Figure 4:
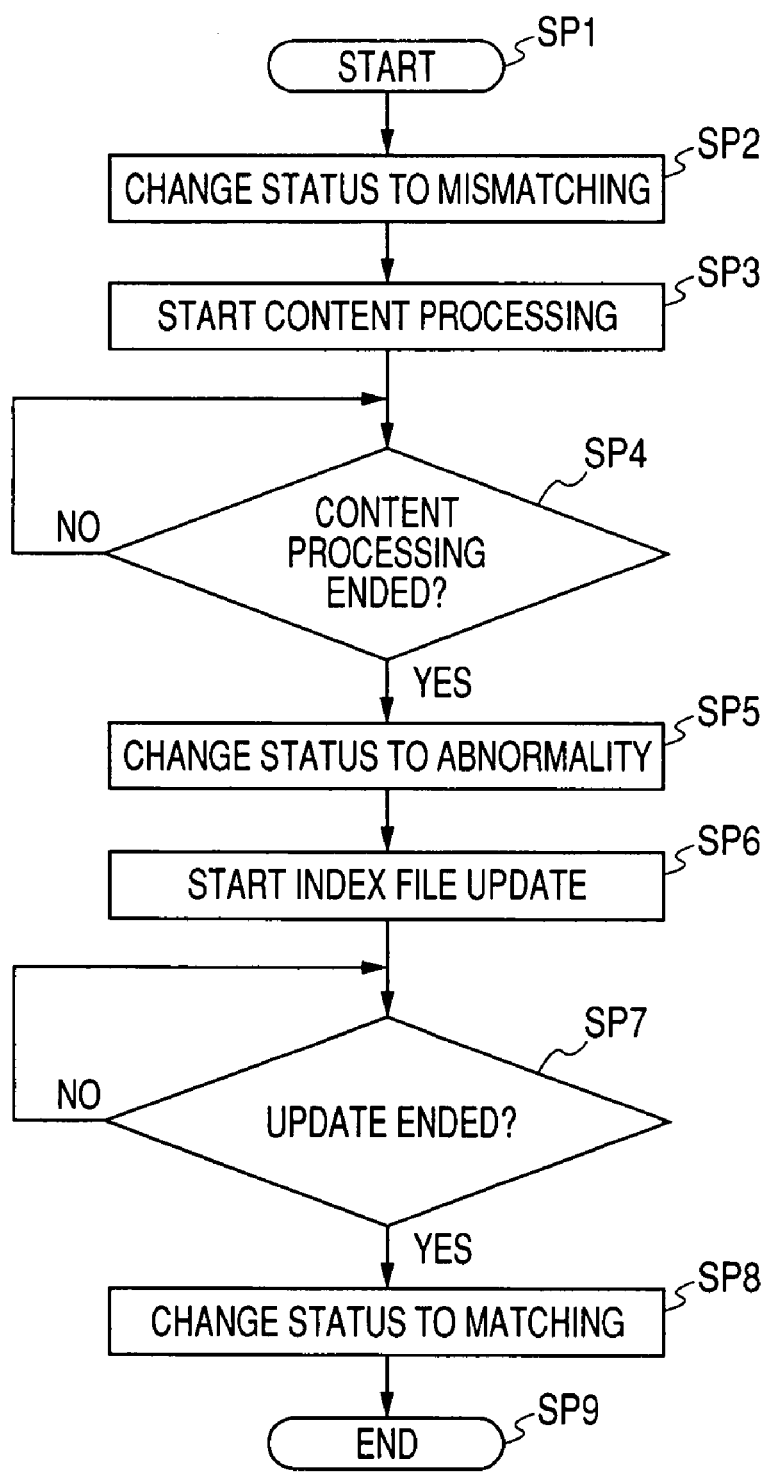
FIG. 4 is a flowchart showing a series of process procedures of a microcomputer relating to setting up of status information.

The flowchart in FIG. 4 shows a series of process procedures related to status-information setting up.

Instructed to change the contents file recorded in the buffer memory 9 (to record the content file onto the recording medium 2 or to delete the content file from the recording medium 2) by the user, the microcomputer 4 starts the process procedure and moves from step SP1 to step SP2. At the step SP2, the microcomputer 4 changes the state of the status flag in the nonvolatile memory 15 from "matching" to "mismatching".

Then, at step SP3, the microcomputer 4 instructs a content-file change (recording or deletion) to the various sections, such as recording and reproducing section, and updates the index file data held in the index-file memory 5.

Then, at step SP4, the microcomputer 4 determines (detects) whether or not the content-file change (recordation or deletion) has been terminated. The microcomputer 4 performs the determination depending upon the response from the recording and reproducing section 3. The microcomputer 4, when determining the content-file change (recordation or deletion) has been terminated, moves from the step SP4 to step SP5.

At the step SP5, the microcomputer 4 changes the state of the status flag in the nonvolatile memory 15 from "mismatching" to "abnormality". Because the state of the status flag set in the nonvolatile memory 15 is changed from "mismatching" to "abnormality" in this manner upon a termination of content-file change, the "mismatching" state of the status flag in the nonvolatile memory 15 indicates that it is in a first process stage to a termination of changing the content file after a start of changing the content file. Namely, "mismatching" is indicative of being in a stage that the content-file change is not yet terminated.

Then, at step SP6, the microcomputer 4 instructs the recording and reproducing section 3 to update the index file recorded on the recording medium 2 depending upon the index file data held in the index-file memory 5. Based on the instruction, the recording and reproducing section 3 updates the index file recorded on the recording medium 2 and then updates also the file-management system recorded on the recording medium 2.

At step STSP7, the microcomputer 4 determines (detects) whether or not the index-file update and further the file-management system update have been terminated. The microcomputer 4 performs the determination depending upon the response from the recording and reproducing section 3. The microcomputer 4, when it determines the update of the index file, etc. has been terminated, moves from step SP7 to step SP8.

At the step SP8, the microcomputer 4 changes the state of the status flag in the nonvolatile memory 15 from "abnormality" to "matching". In this manner, because of changing the state of the status flag set in the nonvolatile memory 15 from "abnormality" to "matching" when the update of the index file completed, the "abnormality" of the status flag in the nonvolatile memory 15 is indicative of being in a second process stage to a termination of updating the index file after a termination of changing the content file. Namely, "abnormality" is indicative of the processing lying in a stage that the index-file update is not yet terminated.

After the process at the step SP8, the microcomputer 4 moves to step SP9 where it terminates the series of process procedures related to the status-information setting up.

By executing the series of process procedures related to the status-information setting up by means of the microcomputer 4, the state of the status flag set in the nonvolatile memory 15 is sequentially changed so as to indicate the process stage. Consequently, in the event that the apparatus body is, for example, powered off in the course of executing the series of process procedures by the microcomputer 4, the state of the status flag in the nonvolatile memory 15 is held in the state indicative of a process stage at which the process is upon disconnection of power.

Therefore, at the next power-on, the microcomputer 4 is allowed to know in which process stage the trouble, such as power disconnection, occurred depending upon the state of the status flag in the nonvolatile memory 15. Thus, index file repair can be conducted as required.

Figure 5:
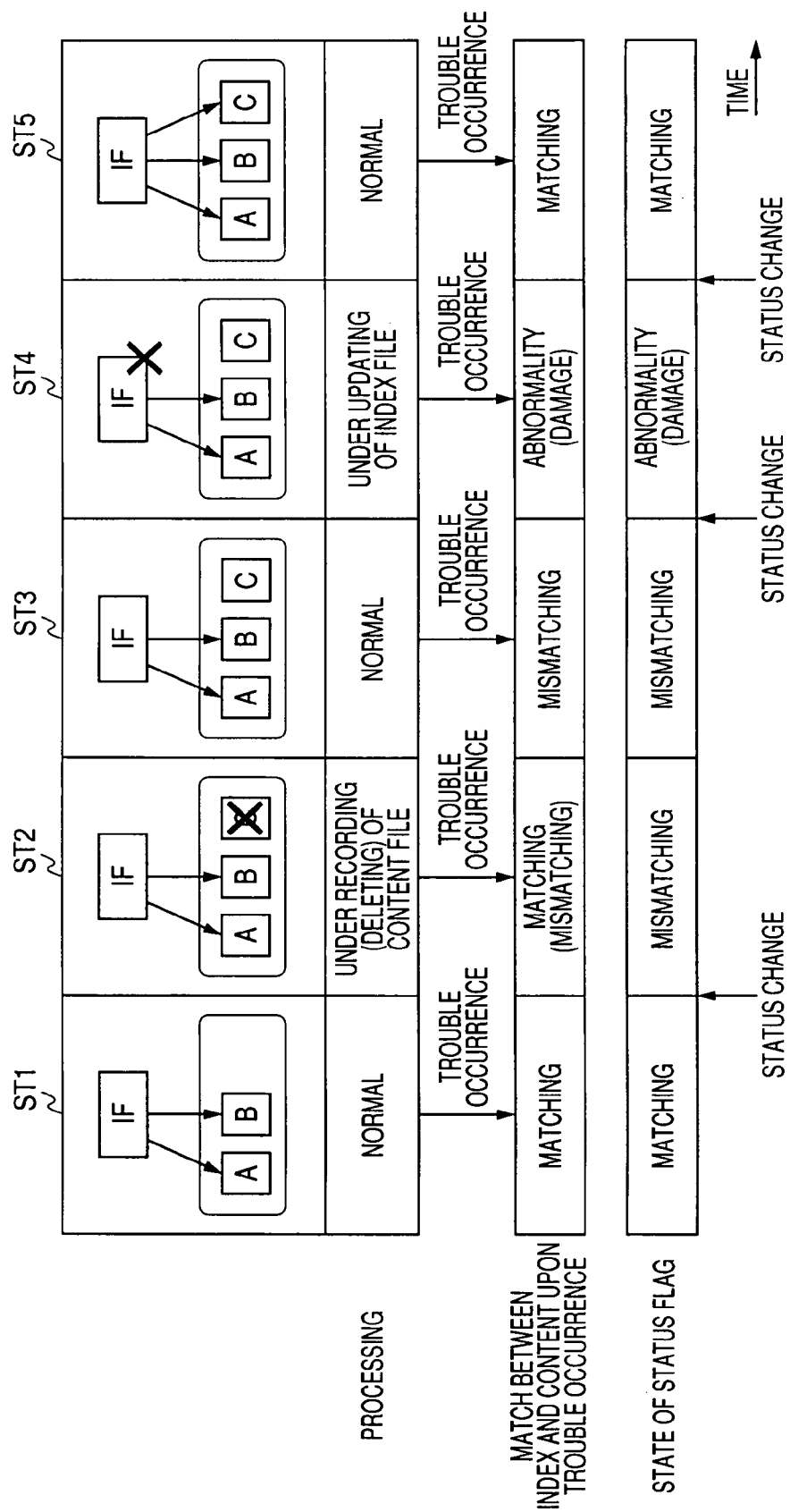
FIG. 5 is a figure showing a status change, a matching/mismatching between the index and content files in the event of an occurrence of a trouble, such as power disconnection, on the apparatus body in each process stage (state) and a state of a status flag held in a nonvolatile memory.

FIG. 5 shows a status change, a matching/mismatching between the index and content files in the event that a trouble, such as power disconnection, occurs on the apparatus body in each process stage (state) and the state of the status flag held in the nonvolatile memory 15.

In the event that a trouble such as power disconnection occurs, on the apparatus body in state ST1 that content files A, B and index file IF, produced with a set of attribute information of the content files A, B, exist on a recording medium, the status flag in the nonvolatile memory 15 is held in an "matching" state.

Meanwhile, when a content-file C change (recordation or deletion) is started in the normal condition ST1, the status flag in the nonvolatile memory 15 is changed to a "mismatching" state and if a trouble, such as power disconnection, occurs in state ST2 that the content file is under change, the status flag in the nonvolatile memory 15 is held in the "mismatching" state.

Meanwhile, in the event that a trouble, such as power disconnection, occurs in a state ST3, that is, to an update start of the index file IF after the termination of content file C change, the status flag in the nonvolatile memory 15 is kept in the "mismatching" state.

Meanwhile, when index-file IF update is started in the normal condition ST3, the status flag in the nonvolatile memory 15 is changed to an "abnormality" (damaged) state. In the event that a trouble, such as power disconnection, occurs in a status ST4 that the index file is under update, the status flag in the nonvolatile memory 15 is kept in the "abnormality" state.

Meanwhile, when the update of the index file IF terminates, the status flag in the nonvolatile memory 15 is changed to a "matching" state. In the event that a trouble, such as power disconnection, occurs in a state ST5 that the index-file IF update has been completed, the status flag in the nonvolatile memory 15 is kept in the "matching" state.

Incidentally, although the status flag in the embodiment has three states, i.e. "matching", "mismatching" and "abnormality", there may be provided more statuses to show the process stage with more exact divisions.

Figure 6:
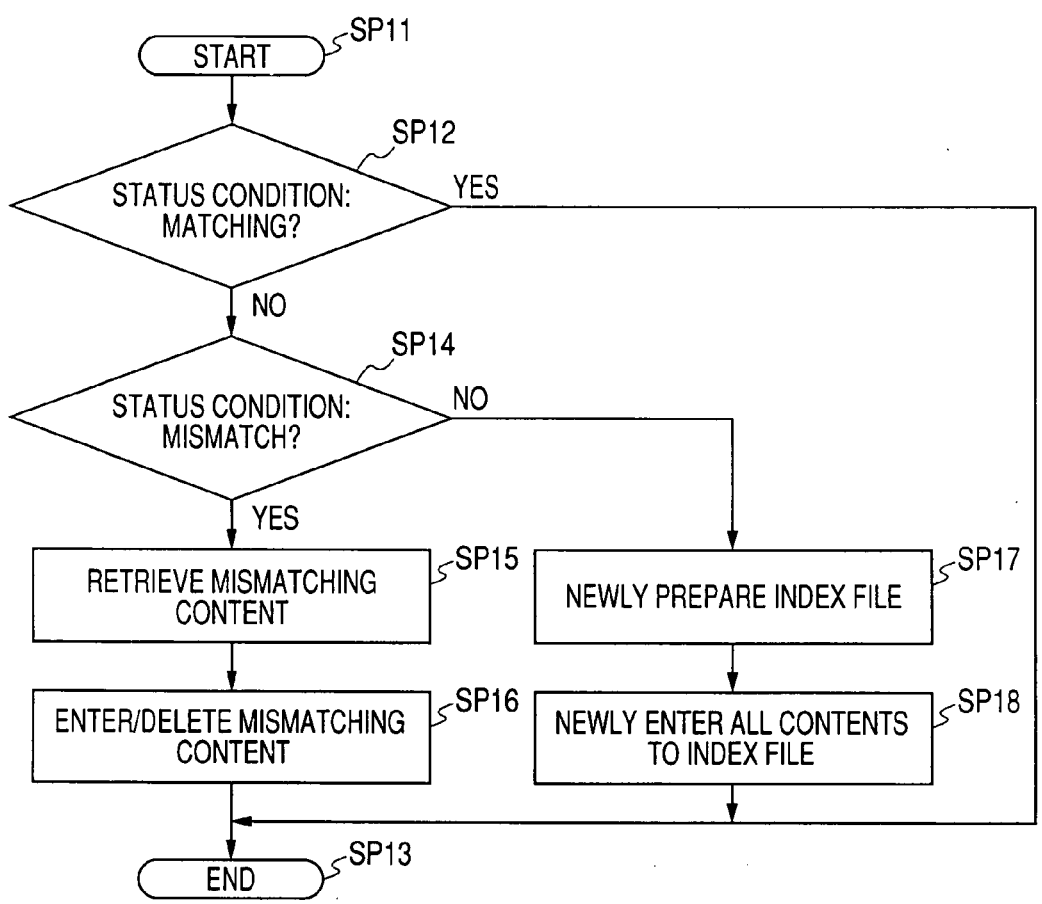
FIG. 6 is a flowchart showing a series of process procedures of the microcomputer relating to index file repair.

Next, explanation is made on the repair operation of index file. The repair operation is performed upon turning on power, depending on the state of the status flag set up in the nonvolatile memory 15. The flowchart in FIG. 6 shows a series of process procedures related to the repair operation of the index file.

When the file-management system data recorded on the recording medium 2 is loaded onto the recording and reproducing section 3 by turning on power, the process procedure is started to move the process from step SP11 to step SP12.

At the step SP12, the microcomputer 4 determines whether or not the status flag in the nonvolatile memory 15 is in the "matching" state. When it determines as "matching", the microcomputer 4 moves from step SP12 to step SP13 thus ending the present process procedure. In this case, as mentioned before, the recording and reproducing section 3 reads out the index file data recorded on the recording medium 2 and stores it in the index-file memory 5, under control of the microcomputer 4.

The microcomputer 4, when it determines at the step SP12 that the status flag in the nonvolatile memory 15 is not in the "matching" state, moves from the step SP12 to step SP14. At the step SP14, the microcomputer 4 determines whether or not the status flag in the nonvolatile memory 15 is in a "mismatching" state.

When it determines "mismatching", the microcomputer 4 moves from the step SP14 to step SP15. The "mismatching" state of the status flag means that there occurred a trouble, such as power disconnection, in the first process stage, that is, to a termination of changing the content file after starting a content file update. In this case, it can be considered that a certain abnormality occurred on the content file side though the index file is not broken.

Accordingly, at the step SP15, the microcomputer 4 retrieves a mismatched content file that does not match the index file. At step SP16, the microcomputer 4 updates the index file in accordance with the mismatched content file retrieved at the step SP15, thereby taking a match between the index and content files. Thereafter, the microcomputer 4 moves to the step SP13 thus ending the present process procedure.

Incidentally, the microprocessor 4 executes, for example, the following concrete processes at the steps SP15 and SP16.

The microcomputer 4 loads the index file, recorded on the recording medium 2, into the index-file memory 5. Meanwhile, although not described above, where making a change (recordation or deletion) to a predetermined content file, the microcomputer 4 records on the recording medium 2 a flag indicative of a start of changing the predetermined content file when starting the process. When the process is terminated, it records on the recording medium 2 a flag indicative of a termination of changing the predetermined content file.

Based upon the index file loaded into the index-file memory 5 and the flag to be recorded onto the recording medium 2 upon the change of the content file, the microcomputer 4 finds a mismatched content file that does not match the index file, i.e. a content file not entered in the index file or a content file not deleted from the index file.

As for the content files not entered in the index file, the microcomputer 4 enters those in the index file recorded in the index-file memory 5. Concerning the content files not deleted, the microcomputer 4 deletes those from the index file recorded in the index-file memory 5.

The microcomputer 4 repairs the index file over the index-file memory 5 in this manner, and then updates the index file recorded on the recording medium 2 by means of the repaired index file.

The microcomputer 4, when determined at the step SP14 that the status flag in the nonvolatile memory 15 is not in the "mismatching" state, moves from the step SP14 to step SP17. In this case, the status flag is in the "abnormality" state. The fact that the status flag is in the "abnormality" state means that it is in a second process stage to a termination of updating the index file after a termination of changing the content file. In this case, it can be considered that the index file is broken and the relevant index file is not to be reproduced correctly.

Accordingly, at step SP17, the microcomputer 4 newly produces an index file in the index-file memory 5. Then, at step SP18, the microcomputer 4 updates the index file, held in the index-file memory 5, depending upon the content file recorded on the recording medium 2, thus recording the index file onto the recording medium 2. Thereafter, the microcomputer 4 moves to the step SP13 thus ending the relevant process procedure.

Incidentally, the microprocessor 4 executes, for example, the following concrete processes at the step SP18. The microcomputer 4 reproduces sequentially the content files recorded on the recording medium 2, and produces thumbnail image data by means of the encoder 6 or through an arithmetic operation and records it in the index-file memory 5. Meanwhile, the microcomputer 4 acquires the data of a file name, preparation date and update date from the file management system, and records it in the index-file memory 5.

Incidentally, the microcomputer 4 may perform the index-file repairing by means of a background of a series of processes upon turning on power so that the processes other than the index-file process, e.g. taking an image, can be performed in a brief time.

In the digital still camera 1 shown in FIG. 1, a status flag indicative of being in a predetermined process stage is set up in the nonvolatile memory 15, in the predetermined process stage from a start of changing (recording or deleting) the content file to a completion of updating the index file (see FIG. 4). Accordingly, the microcomputer 4, upon turning on power, is allowed to easily determine the matching/mismatching between the index and content files recorded on the recording medium 2 by the utilization of the status flag in the nonvolatile memory 15, thus making it possible to repair the index file as required.

Meanwhile, in the digital still camera shown in FIG. 1, in the case that the status flag stored in the nonvolatile memory 15 is in a "mismatching" state upon turning on power, the index file is not broken but any abnormality is considered occurring on the content-file side. The microcomputer 4 corrects the index file only in its portion not matching the content file. Meanwhile, in the digital still camera 1 shown in FIG. 1, in the case the status flag stored on the nonvolatile memory 15 is in an "abnormality" state when turning on power, the index file is considered broken. Hence, the microcomputer 4 newly generates an index file depending upon the content file recorded on the recording medium 2. Meanwhile, in the digital still camera 1 shown in FIG. 1, in the case that the status flag stored on the nonvolatile memory 15 is in a "matching" state when turning on power, the microcomputer 4 does not repair the index file at all. Namely, the microcomputer 4 is allowed to repair the index file as required and with efficiency by referring to the state of the status flag set up in the nonvolatile memory 15.

Meanwhile, in the digital still camera 1 shown in FIG. 1, when listing display is instructed by user's operation, the microcomputer 4 sequentially acquires the corresponding one of thumbnail image data to each content file from the index file data recorded in the index-file memory 5, to display on the display section 12 a listing of the thumbnail images related to the content files recorded on the recording medium 2. Incidentally, a listing of titles can also be displayed instead of the thumbnail images, according to an instruction due to user's operation. In the digital still camera 1 shown in FIG. 1, when turning on power, the index file for use in listing display is repaired, if it does not match the content file, depending upon the state of the status flag stored in the nonvolatile memory 15 as mentioned before. Accordingly, according to the digital still camera 1 shown in FIG. 1, the content files recorded on the recording medium 2 can be correctly offered to the user by display a listing thereof.

Incidentally, in the above embodiment, because the state that the content file is being changed and the state that the index file is being updated are distinguished depending upon the state of the status flag, the status flag set up in the nonvolatile memory 15 is changed three times, that is, from "matching" to "mismatching", from "mismatching" to "abnormality" and from "abnormality" to "matching" each time updating the index file (see FIG. 4), thus requiring time in the processing. Meanwhile, where the nonvolatile memory 15 uses a flash memory, there is a need to secure a sufficient storage area for setting the status flag because of the limitation in the number of rewrite cycles to the flash memory.

For this reason, it can be conceived to reduce the number of status-change cycles of the status flag set up in the nonvolatile memory 15 by not distinguishing between content-file change and index-file update but setting the states of the status flag as "abnormality" in the both cases. By thus reducing the number of status change cycles of the status flag, the time required for processing can be shortened while flash memory life can be increased.

Figure 7:
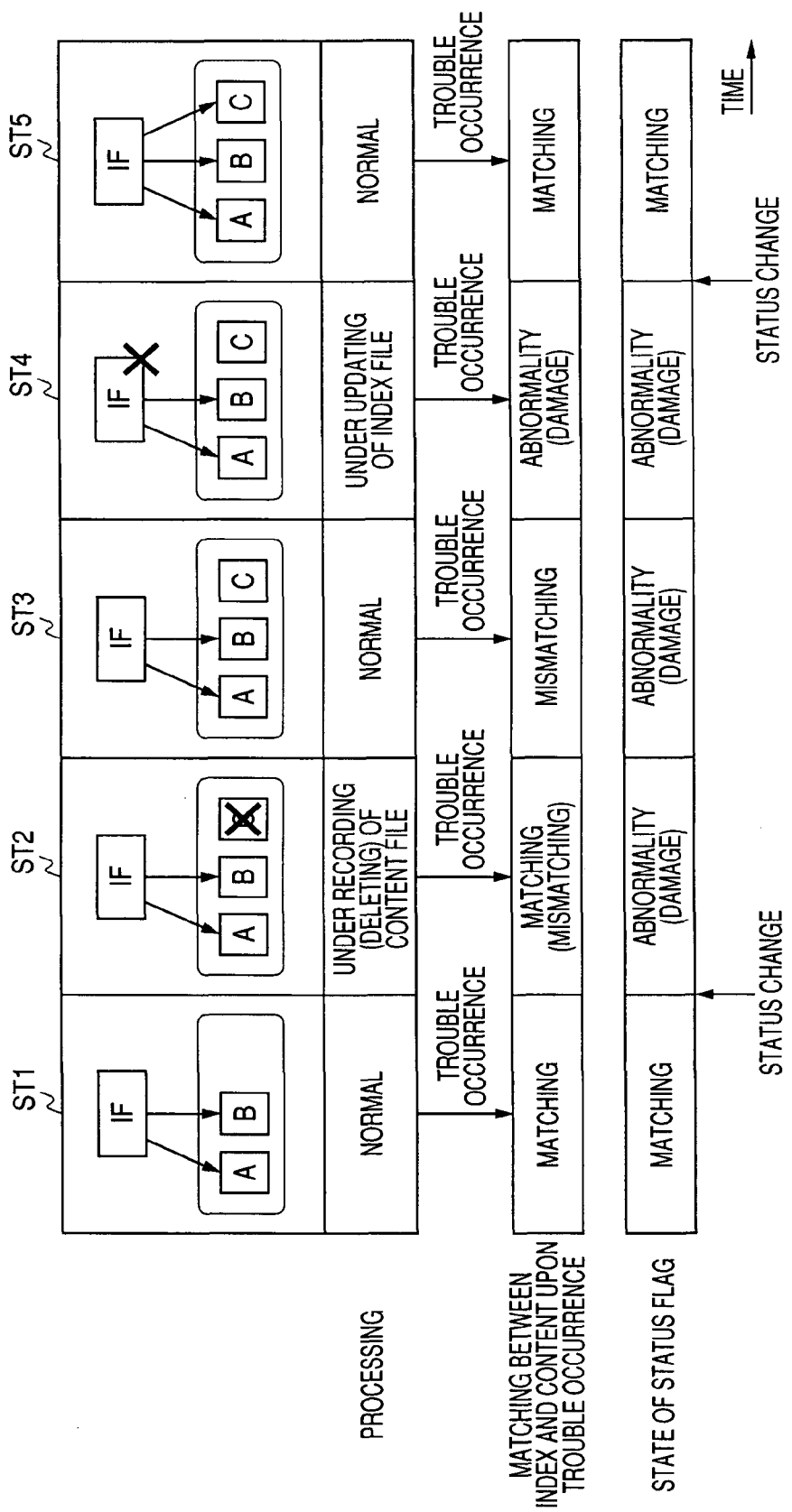
FIG. 7 is a figure showing a status change, a matching/mismatching between the index and content files in the event of an occurrence of a trouble, such as power disconnection, on the apparatus body in each process stage (state) and a state of a status flag held in a nonvolatile memory.

FIG. 7 shows a status change, a matching/mismatching between the index and content files in the event that a trouble such as power disconnection occurs in each process stage (state), and the state of the status flag held in the nonvolatile memory 15.

In the event of a trouble occurrence, such as power disconnection in a state ST1 that content files A, B and an index file IF, produced with a set of attribute information of the content files A, B, are existent on a recording medium, the state of the status flag in the nonvolatile memory 15 is kept as "matching".

Meanwhile, in case content-file C change (recording or deletion) is started in the normal state ST1, the state of the status flag in the nonvolatile memory 15 is changed to "abnormality (broken)". In the event that a trouble, such as power disconnection, occurs in a state ST2 that the content file is under change, the state of the status flag in the nonvolatile memory 15 is kept as "abnormality".

Meanwhile, in the event that a trouble, such as power disconnection, occurs in a state ST3, that is, from a termination of changing the content file C to a start of updating the index file IF, the state of the status flag in the nonvolatile memory 15 is kept as "abnormality".

Meanwhile, even if index-file IF update is started in the normal state ST3, there is no change in the state of the status flag in the nonvolatile memory 15. Accordingly, in the event that a trouble, such as power disconnection, occurs in a state ST4 that the index file IF is under update, the state of the status flag in the nonvolatile memory 15 is kept as "abnormality".

Meanwhile, in case the index-file IF update terminates, the state of the status flag in the nonvolatile memory 15 is changed to "matching". Accordingly, in the event that a trouble, such as power disconnection, occurs in a state ST5 that the index-file IF update has terminated, the state of the status flag in the nonvolatile memory 15 is kept as "matching".

Figure 8:
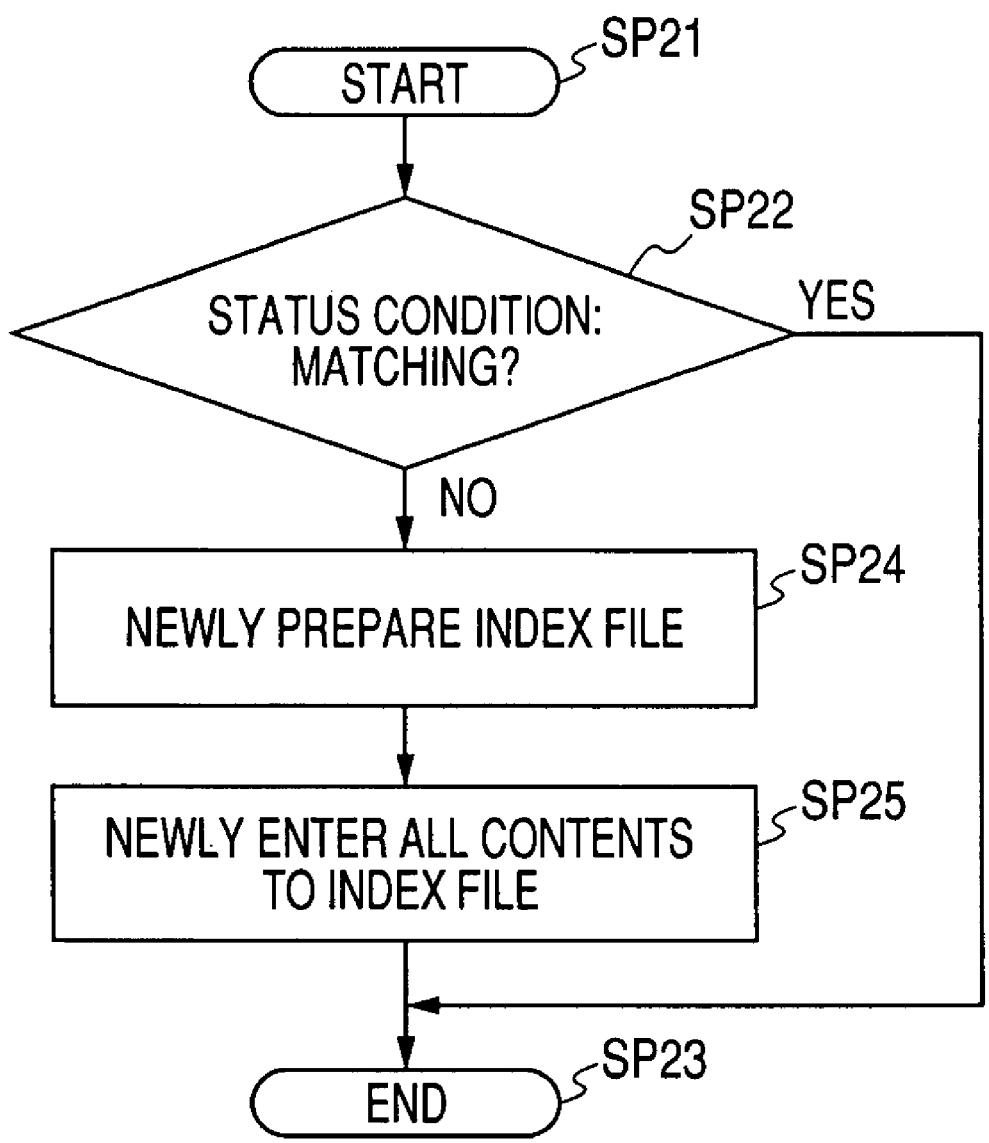
FIG. 8 is a flowchart showing a series of process procedures of the microcomputer relating to index file repair.

In the case that the status of the status flag set up in the nonvolatile memory 15 is changed in the manner as shown in FIG. 7, the microcomputer 4 repairs the index file along a series of process procedures related to the index-file repair operation shown in a flowchart of FIG. 8.

When power is turned on and the file-management system data recorded on the recording medium 2 is loaded onto the recording and reproducing section 3, the microcomputer 4 starts the process procedure and moves from step SP21 to step SP22.

At the step SP22, the microcomputer 4 determines whether or not the state of the status flag in the nonvolatile memory 15 is "matching". When it determined as "matching", the microcomputer 4 moves from the step SP22 to step SP23 thus terminating the process procedure. In this case, the recording and reproducing section 3 reads out the index file data recorded on the recording medium 2 and stores it in the index-file memory 5 according to the control of the microcomputer 4.

The microcomputer 4, when it determined the state of the status flag in the nonvolatile memory 15 is not "matching" at the step SP22, moves from the step SP22 to step SP24. In this case, the status flag is in "abnormality". The fact that the status flag is in "abnormality" means that it is in a process stage to a termination of updating the index file after a start of changing the content file.

At the step SP24, the microcomputer 4 newly prepares an index file in the index-file memory 5. At step SP25, the microcomputer 4 updates the index file held in the index-file memory 5 depending upon the content file recorded on the recording medium 2, and records the index file onto the recording medium 2. Thereafter, the microcomputer 4 moves to the step SP23 thus ending the process procedure.

Incidentally, the above embodiment showed the case that the status flag as status information is recorded in the nonvolatile memory 15 such as a flash memory. Alternatively, a status file having status information may be recorded on the recording medium 2. In this case, the recording medium 2 has a storage area where a storage matter is to be held even if power is turned off. In this case, the status file is recorded in the beginning of a data area on the recording medium 2, to shorten the time required for recording/reproducing the status file.

Where the recording medium 2 records thereon a status file having status information as in the above, the microcomputer 4, upon turning on power, accesses the recording medium 2 and loads the status file so that the index file can be repaired based upon the state of the status information (see FIGS. 6 and 8).

By thus recording the status file having status information on the recording medium 2, the recording area on the recording medium 2 can be used efficiently and moreover made unnecessary in the nonvolatile memory 15. Thus, the digital still camera 1 can be structured inexpensively and further the digital still camera 1 can be simplified in its structure.

Figure 9:
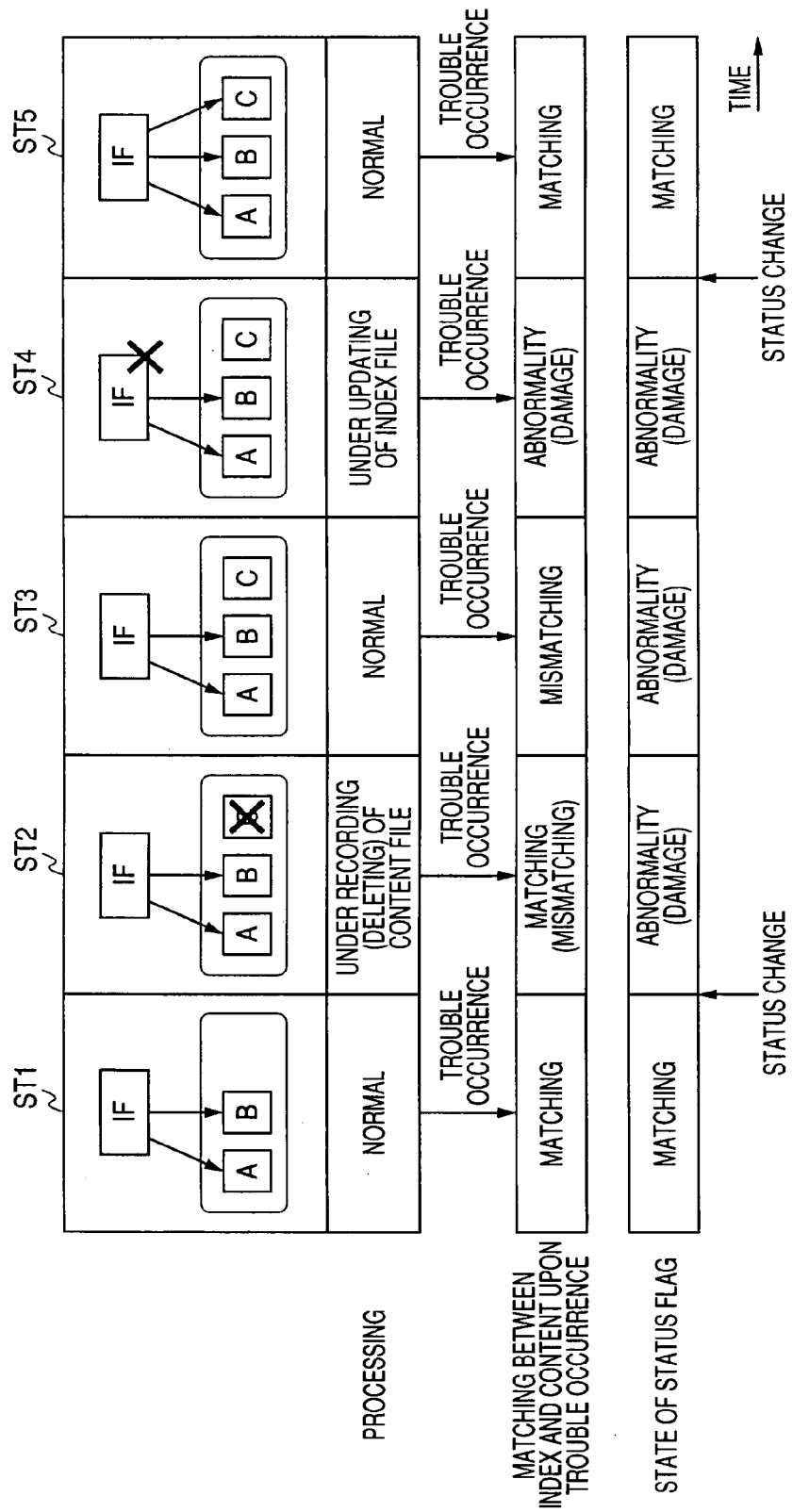
FIG. 9 is a figure showing a status change, a matching/mismatching between the index and content files in the event of an occurrence of a trouble, such as power disconnection, on the apparatus body in each process stage (state) and a state of a status flag recorded on a recording medium.

FIG. 9 shows the matching/mismatching between the index and content files and the state of the status file recorded on a recording medium in the event that a trouble, such as power disconnection occurs in each process stage (state). Incidentally, in the example shown in FIG. 9, content-file update and index-file update are not distinguished so that, in the both cases, the status flag is held as "abnormality".

Meanwhile, in place of recording a status file having status information onto the recording medium 2 as mentioned above, whether or not a status file exists on the recording medium 2 may be used as status information. In this case, the microcomputer 4 starts a content-file change (recording or deletion) after recording a status file onto the recording medium 2. Meanwhile, after the index file is subsequently updated and the index-file update is terminated, the status file is deleted from the recording medium 2. Such status-file deletion is executed by updating the file-management system data on the recording medium 2.

By thus setting up status information depending upon the presence/absence of a status file on the recording medium 2, the microcomputer 4 is allowed to determine the status depending upon the file-management system data acquired from the recording medium 2 upon turning on power. Accordingly, this can simplify the processing upon turning on power.

Figure 10:
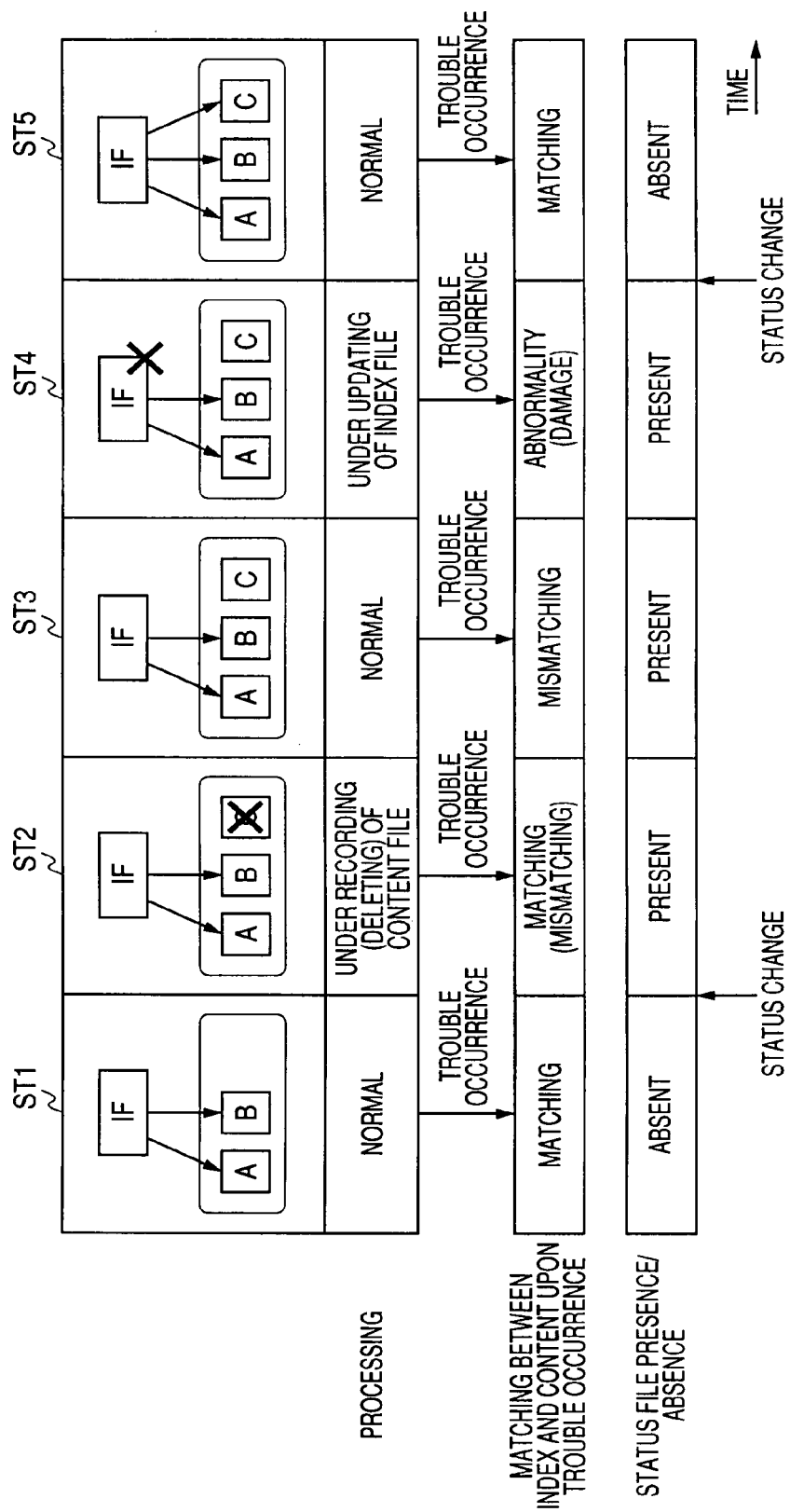
FIG. 10 is a figure showing a status change, a matching/mismatching between the index and content files in the event of an occurrence of a trouble, such as power disconnection, on the apparatus body in each process stage (state) and a presence/absence of record of a status file onto the recording medium.
Figure 11:
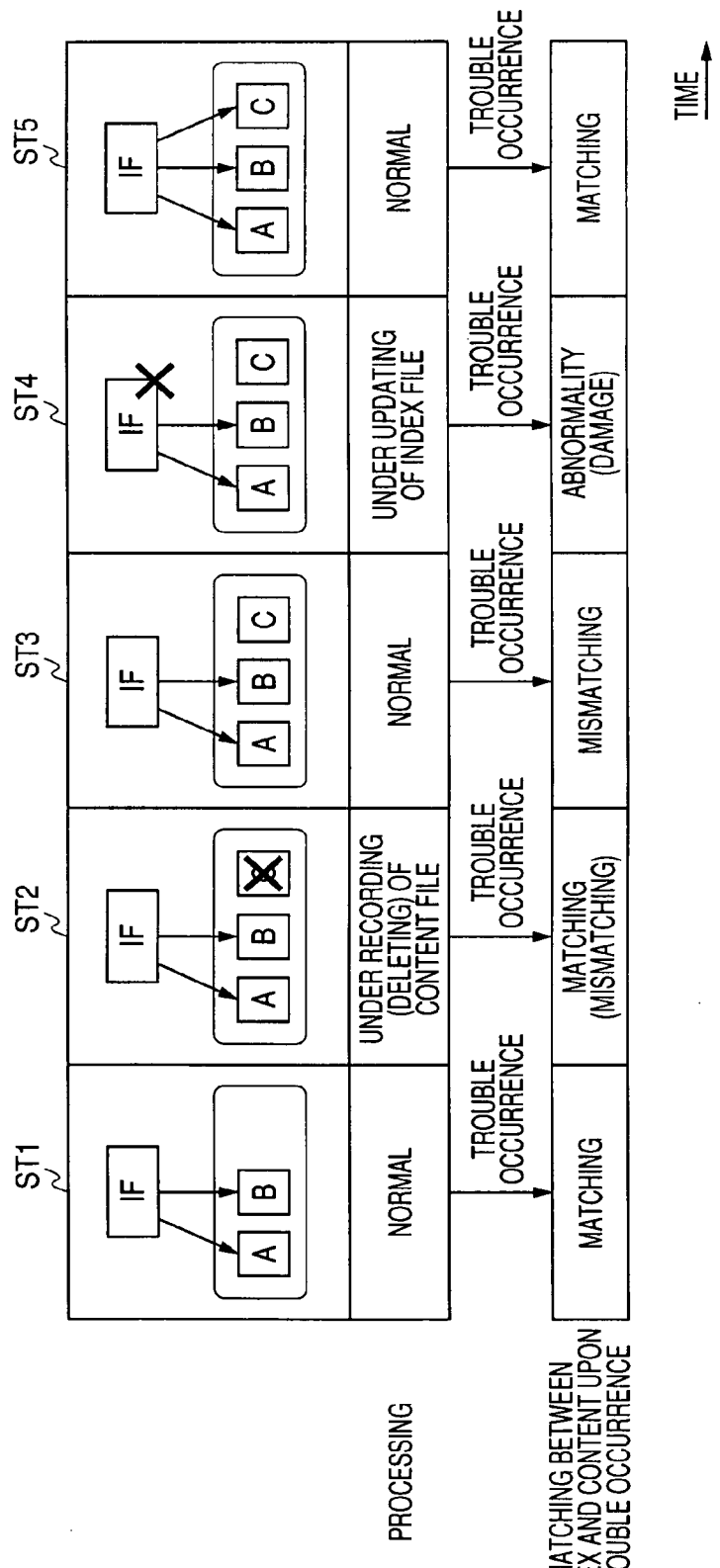
FIG. 11 is a figure for explaining a matching/mismatching between the index and content files.

FIG. 10 shows a matching/mismatching between the index and content files in the event that a trouble such as power disconnection occurs on the apparatus body and a presence/absence of recording of a status flag onto the recording medium, in each process stage (state). Incidentally, in the example shown in FIG. 10, the status file is recorded onto the recording medium without distinguishing between content-file change and index-file update.

Meanwhile, the foregoing embodiments described the case that the status flag is recorded in the nonvolatile memory 15 or the file related to status is recorded on the recording medium 2. However, the invention is not limited thereto, but the status flag may be recorded on the recording medium 2. Alternatively, the file related to status may be recorded in a nonvolatile memory.

Meanwhile, the foregoing embodiments described the case that the status file is recorded onto the recording medium in the duration from a start of changing the content file to a termination of updating the index file. However, the invention is not limited to it but the status file may be not recorded onto the recording medium in the duration from a start of changing the content file to a termination of updating the index file.

Meanwhile, the foregoing embodiments described the case that the content and index files resulting from image taking are recorded onto the recording medium 2 including, for example, a memory card. However, the invention is not limited to it but application is possible broadly to cases where content and index files are recorded in various recording mediums including optical disks, magnetic disks and various types of servers connected through networks.

Meanwhile, the foregoing embodiments described the case that the invention is applied to the digital still camera wherein the content file resulting from still-image taking is recorded. However, the invention is not limited to it but application is possible broadly to various content-related recording/reproducing apparatuses, e.g. where to record a content file based on a moving image, where to record a content file based on a music content, and so on.

INDUSTRIAL APPLICABILITY

The present invention is capable of easily determining the matching/mismatching of the index and content files recorded on the recording medium when turning on power, and is applicable, for example, to a digital still camera camcorder.

The invention claimed is:

1. A recording apparatus that records one or more content files and an index file produced with a set of attribute information of the content files, onto a recording medium, the recording apparatus comprising:
    a content file changing section that changes the content files recorded onto the recording medium; and
    a processor operable to function as:
        an index file updating section that, when the content files are changed by the content file changing section, updates the index file associated with the content files being changed, and
        a status-information setting section that sets up, in a storage area where storage matter can be held in the recording apparatus even during power-off, status information that is indicative of the recording apparatus being in a predetermined process stage that starts from a start of changing the content file by the content-file changing section to a termination of updating the index file by the index-file updating section, the status information having a same value during all of the predetermined process stage.

2. A recording apparatus according to claim 1, wherein the predetermined process stage includes a first process stage from a start of changing the content file to a termination of changing the content file, and a second process stage from a termination of changing the content file to a termination of updating the index file.

3. A recording apparatus according to claim 2, further comprising an index-file repairing section that corrects the index file recorded in the recording medium in a portion not matching the content files recorded on the recording medium when the status information is indicative of being in the first process stage, and produces the index file and recording the same onto the recording medium depending upon the content files recorded on the recording medium when the status information is indicative of being in the second process stage.

4. A recording apparatus according to claim 1, further comprising an index-file repairing section that repairs the index file recorded on the recording medium depending upon the content files recorded on the recording medium when the status information is indicative of being in a course of processing.

5. A recording apparatus according to claim 4, further comprising a to-user offering section that offers, to a user, selection of one or more of the content files recorded on the recording medium for reproduction depending upon the index file, the to-user offering section offers to the user selection of one or more of the content files recorded on the recording medium for reproduction depending upon the index file repaired by the index repairing section when the status information stored in the storage area is indicative of being in a course of processing, and offers to the user selection of one or more of the content files recorded on the recording medium for reproduction depending upon the index file recorded on the recording medium when the status information is indicative of termination of the processing.

6. A recording apparatus according to claim 1, wherein the status-information setting section sets up, in the storage area, the status information to have one other value that is indicative of the recording apparatus not being in the predetermined process stage.

7. A recording apparatus according to claim 1, wherein the status-information setting section sets up, in the storage area, absence of the status information that is indicative of the recording apparatus not being in the predetermined process stage.

8. A recording method that records one or more content files and an index file produced with a set of attribute information of the content files onto a recording medium, the recording method comprising:

changing the content files recorded onto the recording medium;

updating, when the content files are changed by the content file changing step, the index file associated with the content files being changed; and setting up, in a storage area where storage matter can be held in the recording apparatus even during power-off, status information that is indicative of being in a predetermined process stage that starts from a start of changing the content file by the content-file changing section to a termination of updating the index file by the index-file updating section, the status information having a same value during all of the predetermined process stage.

9. A recording method according to claim 8, wherein the status-information setting up step includes setting up, in the storage area, the status information to have one other value that is indicative of the recording apparatus not being in the predetermined process stage.

10. A recording method according to claim 8, wherein the status-information setting up step includes setting up, in the storage area, absence of the status information that is indicative of the recording apparatus not being in the predetermined process stage.

11. A recording method according to claim 8, wherein the predetermined process stage includes a first process stage from a start of changing the content file to a termination of changing the content file, and a second process stage from a termination of changing the content file to a termination of updating the index file.

12. A recording method according to claim 11, further comprising:

when the status information is indicative of being in the first process stage,
correcting the index file recorded in the recording medium in a portion not matching the content files recorded on the recording medium, and when the status information is indicative of being in the second process stage,
producing the index file and recording the same onto the recording medium depending upon the content files recorded on the recording medium.

13. A recording method according to claim 8, further comprising:

repairing the index file recorded on the recording medium depending upon the content files recorded on the recording medium when the status information is indicative of being in a course of processing.

14. A recording method according to claim 13, further comprising:

offering, to a user, selection of one or more of the content files recorded on the recording medium for reproduction depending upon the index file, including:
offering to the user selection of one or more of the content files recorded on the recording medium for reproduction depending upon the index file repaired by the index repairing section when the status information stored in the storage area is indicative of being in a course of processing, and offering to the user selection of one or more of the content files recorded on the recording medium for reproduction depending upon the index file recorded on the recording medium when the status information is indicative of termination of the processing.

15. A processor encoded with a computer program to execute a recording method to record one or more content files and an index file produced from a set of attribute information of the content files onto a recording medium, the recording method comprising:

changing the content files recorded onto the recording medium;

updating, when the content files are changed by the content file changing step, the index file associated with the content files being changed; and setting up, in a storage area where storage matter can be held in the recording apparatus even during power-off, status information that is indicative of being in a predetermined process stage that starts from a start of changing the content file by the content-file changing section to a termination of updating the index file by the index-file updating section, the status information having a same value during all of the predetermined process stage.

16. A processor according to claim 15, wherein the status-information setting up step includes setting up, in the storage area, the status information to have one other value that is indicative of the recording apparatus not being in the predetermined process stage.

17. A processor according to claim 15, wherein the status-information setting up step includes setting up, in the storage area, absence of the status information that is indicative of the recording apparatus not being in the predetermined process stage.

18. A processor according to claim 15, wherein the predetermined process stage includes a first process stage from a start of changing the content file to a termination of changing the content file, and a second process stage from a termination of changing the content file to a termination of updating the index file.

19. A processor according to claim 18, wherein the recording method further comprises:

when the status information is indicative of being in the first process stage,
correcting the index file recorded in the recording medium in a portion not matching the content files recorded on the recording medium, and when the status information is indicative of being in the second process stage,
producing the index file and recording the same onto the recording medium depending upon the content files recorded on the recording medium.

20. A processor according to claim 15, wherein the recording method further comprises:

repairing the index file recorded on the recording medium depending upon the content files recorded on the recording medium when the status information is indicative of being in a course of processing.

21. A processor according to claim 20, wherein the recording method further comprises:

offering, to a user, selection of one or more of the content files recorded on the recording medium for reproduction depending upon the index file, including:
offering to the user selection of one or more of the content files recorded on the recording medium for reproduction depending upon the index file repaired by the index repairing section when the status information stored in the storage area is indicative of being in a course of processing, and offering to the user selection of one or more of the content files recorded on the recording medium for reproduction depending upon the index file recorded on the recording medium when the status information is indicative of termination of the processing.

22. A non-transitory computer-readable recording medium for recording a program that causes a computer to execute a recording method in order to record one or more content files and an index file produced with a set of attribute information of the content files onto a recording medium, the recording method comprising:

changing the content files recorded onto the recording medium;

updating, when the content files are changed by the content file changing step, the index file associated with the content files being changed; and setting up, in a storage area where storage matter can be held in the recording apparatus even during power-off, status information that is indicative of being in a predetermined process stage that starts from a start of changing the content file by the content-file changing section to a termination of updating the index file by the index-file updating section, the status information having a same value during all of the predetermined process stage.

23. A non-transitory computer-readable recording medium according to claim 22, wherein the status-information setting up step includes setting up, in the storage area, the status information to have one other value that is indicative of the recording apparatus not being in the predetermined process stage.

24. A non-transitory computer-readable recording medium according to claim 22, wherein the status-information setting up step includes setting up, in the storage area, absence of the status information that is indicative of the recording apparatus not being in the predetermined process stage.

25. A non-transitory computer-readable recording medium according to claim 22, wherein the predetermined process stage includes a first process stage from a start of changing the content file to a termination of changing the content file, and a second process stage from a termination of changing the content file to a termination of updating the index file.

26. A non-transitory computer-readable recording medium according to claim 25, wherein the recording method further comprises:

when the status information is indicative of being in the first process stage, correcting the index file recorded in the recording medium in a portion not matching the content files recorded on the recording medium, and when the status information is indicative of being in the second process stage, producing the index file and recording the same onto the recording medium depending upon the content files recorded on the recording medium.

27. A non-transitory computer-readable recording medium according to claim 22, wherein the recording method further comprises:

repairing the index file recorded on the recording medium depending upon the content files recorded on the recording medium when the status information is indicative of being in a course of processing.

28. A non-transitory computer-readable recording medium according to claim 27, wherein the recording method further comprises:

offering, to a user, selection of one or more of the content files recorded on the recording medium for reproduction depending upon the index file, including:

offering to the user selection of one or more of the content files recorded on the recording medium for reproduction depending upon the index file repaired by the index repairing section when the status information stored in the storage area is indicative of being in a course of processing, and offering to the user selection of one or more of the content files recorded on the recording medium for reproduction depending upon the index file recorded on the recording medium when the status information is indicative of termination of the processing.

* * * * *